United States Patent [19]

Arcella et al.

[11] Patent Number: 4,746,573
[45] Date of Patent: May 24, 1988

[54] FLOWING (FREE-FLOWING) GRANULAR COMPOSITIONS BASED ON FLUORINATED ELASTOMERS

[75] Inventors: Vincenzo Arcella, Novara; Gaetano Bianchi, San Donato Milanese; Dionisio D'Auria, Milan, all of Italy

[73] Assignee: Ausimonth S.p.A., Milan, Italy

[21] Appl. No.: 843,604

[22] Filed: Mar. 25, 1986

[30] Foreign Application Priority Data

Mar. 29, 1985 [IT] Italy ................ 20162 A/85

[51] Int. Cl.⁴ .............. B32B 19/00; C08L 27/12
[52] U.S. Cl. .................... 428/407; 523/201; 523/210; 524/394; 524/400; 524/451; 525/199; 525/200; 427/222
[58] Field of Search ........... 428/407; 525/199, 200; 524/451, 394, 400; 523/201, 210; 427/180, 222

[56] References Cited

U.S. PATENT DOCUMENTS 2,681,324  6/1954  Hochberg ................ 525/199
3,562,195  2/1971  Reiner et al. ............ 525/199
3,682,859  8/1972  Taylor et al. ............ 525/199

FOREIGN PATENT DOCUMENTS 0124955  11/1984  European Pat. Off. ....... 525/199
3204981   8/1983  Fed. Rep. of Germany .... 525/199
0207810   3/1984  German Democratic Rep. .. 525/199
59-923    5/1984  Japan ................... 525/199
0193940  11/1984  Japan ................... 525/199

OTHER PUBLICATIONS

Derwent Abs. 10229E/06, 2-1982, EP—45064 Furukawa.

Primary Examiner—Herbert J. Lilling
Attorney, Agent, or Firm—Stevens, Davis, Miller & Mosher

[57] ABSTRACT

Free-flowing granular compositions based on fluoroelastomers containing dispersed on their surface, as an anti-caking agent, from 5% to 70% by weight of a polyolefine powder.

14 Claims, No Drawings

FLOWING (FREE-FLOWING) GRANULAR COMPOSITIONS BASED ON FLUORINATED ELASTOMERS

DESCRIPTION OF THE INVENTION

The present invention relates to free-flowing granular compositions based on fluoroelastomers.

More particularly, the present invention relates to easy flowing granular compositions based on fluoroelastomers, particularly suited for use in the production of films and other formed or shaped polyolefinic bodies.

As is already known, in the production of polyolefinic films, such as for instance linear low-density polyethylene films, there are used small quantities, in general 400 to 500 ppm of fluoroelastomers as lubricating agents.

In general, there are prepared concentrated dispersions of fluoroelastomer in the polyolefine (master), said dispersions being admixed with polymer during the film-forming stage or during the transformation into a formed or shaped body.

For the preparation of the "master" and for the purpose of obtaining homogeneous films, it is preferable to dispose of the fluoroelastomer in a granular shape with very small particles, such as those ranging from 0.1 to 2 mm. This requires the use of an anti-caking agent such as for instance barium sulphate or calcium stearate, whose quantity increases with increase in the specific surface of the fluoroelastomer, the action of the anti-caking agent being of the surface type.

On the other hand, the quantity of anti-caking agent cannot exceed certain limits of concentration or it would impart to the end product a polluting effect and, thus, negatively influencing its properties. From this it follows that the size of the granules of fluoroelastomer cannot reach the values that are desired for an easy preparation of the master and for obtaining homogeneous films.

Thus, an object of the present invention is that of providing an anti-caking agent for the fluoroelastomer granules that will not show the above described drawbacks.

More particularly, another object of the present invention is that of providing an anti-caking agent for the fluoroelastomer granules that will not act as a pollutant of the polyolefine, so that it may be used also in relatively large quantities.

According to the present invention, these objects (and still further objects) are achieved by using as an anti-caking agent a polyolefine in a powdery form and preferably the same as is used for the production of the film or of any other formed body.

Thus, one obtains according to the present invention free-flowing granular compositions based on fluoroelastomers containing, dispersed on the surface as an anti-caking agent, from 5% to 70%, and preferably from 10% to 30% by weight of a polyolefine in a powdery form.

The use of the polyolefine powder as an anti-caking agent does not exert any polluting effect on the polymer since it is of the same type and, thus, allows one to employ fluoroelastomer granules of extremely small dimensions, such as down to 0.1 mm.

The fluoroelastomers that may be used in said granular compositions are those of the conventional type, well known in the market place and offered by numerous manufacturers, and in particular fluoroelastomers having a fluorine content greater than 65% by weight. Amongst the various known fluoroelastomers may be mentioned copolymers of vinylidene fluoride and hexafluoropropylene, developed on a commercial basis by Du Pont, by the 3M Company, by MONTEFLUOS, by Daikin etc., and known under the trade marks respectively of Viton, Fluorel, Tecnoflon, Daiel, etc.; vinylidene fluoride/hexafluoropropylene/tetrafluoroethylene terpolymers; vinylidene fluoride/tetrafluoroethylene/perfluoromethyl-vinyl-ether terpolymers; tetrafluoroethylene/propylene copolymers; vinylidene fluoride/chloro-trifluoro-ethylene copolymers; vinylidene fluoride/hydropentafluoropropylene copolymers; vinylidene fluoride/hydropentafluoropropylene/tetrafluoroethylene terpolymers, etc. and the corresponding products containing in the chain small quantities of bromine, introduced e.g. in the form of trifluoro-bromo-ethylene.

The term "polyolefines" as used in the present specification and the following claims is understood to include low, high and medium density polyethylene; prevailingly isotactic macromolecules with polypropylene; propylene-ethylene copolymers with a predominant content in propylene, both of the "random" type as well as of the "block" type; and mixtures thereof.

The low-density polyethylene and propylene are the preferred polyolefines for the preparation of the granular compositions of the present invention.

Together with the anti-caking agents of the present invention, there may also be used known anti-caking agents, such as barium sulphate, calcium stearate, and talc.

In order still better to understand the inventive idea of this invention and its practical realization, the following are given as a few illustrative but in no way limiting examples.

In the examples, all parts are given by weight, unless otherwise specified.

EXAMPLE NOS. 1–8

1 kg. of granulated fluoroelastomer with a particle size of about 2 mm, and consisting of 80 mol % of vinylidene fluoride and 20 mol % of perfluoropropylene (Tecnoflon produced by Montefluos S.p.A.) having a Mooney viscosity (at 100° C., 1" 4 min.) of 80, were mixed together in a rotary blade mixer with respectively a low-density polyethylene in quantities as reported in the table below, and with polypropylene likewise in quantities as reported in the table below. The mixes were allowed to remain at rest for 3 days, whereafter they were subjected to a visual examination. The resulting values are recorded in the following table:

TABLE

| Example No. | Anti-Caking Agent | Quantity | Aspect of the granules |
|---|---|---|---|
| 1 | low-density polyethylene | 0 | completely caked |
| 2 | low-density polyethylene | 2 | slightly caked |
| 3 | low density polyethylene | 5 | not caked |
| 4 | low-density polyethylene | 10 | not caked |
| 5 | polypropylene | 2 | slightly caked |
| 6 | polypropylene | 5 | slightly caked |
| 7 | polypropylene | 10 | not caked |
| 8 | polypropylene | 15 | not caked |

EXAMPLE 9

Using the same fluoroelastomer as in Example 1 but with a mean particle size of 0.5 mm, this was mixed with 30% by weight of low-density polyethylene.

Then are prepared tubes of plastic laminate having a thickness of 0.2 mm and containing 340 cc of the fluoroelastomer admixed with the anti-caking agent. At the two ends of each tube there is placed a disk of plastic laminate which is non-deformable under heat and which has a diameter of 60 mm. These disks serve to provide a cylindrical test piece having the two bases parallel to each other. The tubes are placed for 3 days in a chamber having a temperature of 25° C. and pressurized at an absolute pressure of 1.5 kg/cm$^2$.

The caking tendency of the sample is measured with a system that measures the caking index I as the sum of IC+IS, where IC is the breaking charge index expressed as the value, in kg., of the strength necessary to crush the test piece by compression, and IS is the crumbling index, expressed as the value, in seconds, of the time used for crumbling the test piece introduced into a rotating screen with sieve openings of 5 mm and containing 5 steel spheres having a diameter of 2 cm.

According to this system, one arrives at the following correlation:

| I | below 10: | excellent resistance to caking |
|---|---|---|
| I | 11–30: | good |
| I | 31–50: | poor |
| I | higher than 50: | bad |

The test conducted on the test piece containing the anti-caking agent according to the present invention gave a caking tendency I of 16. The same test conducted on a test piece containing the fluoroelastomer without anti-caking agent gave a caking tendency much higher than 50.

EXAMPLE 10

Example 9 was repeated with the same fluoroelastomer containing as anti-caking agents 20% by weight of low-density polyethylene and 1% by weight of calcium stearate. The caking tendency of the sample was 14.

What is claimed is:

1. A free-flowing granular composition based on fluoroelastomers containing dispersed on their surface an anti-caking agent, characterized in that said anti-caking agent is a polyolefin in a powdery form, in quantities between 5% and 70% by weight.

2. A granular composition according to claim 1, characterized in that the fluoroelastomer has a fluorine content greater than 65% by weight.

3. Granular compositions according to either claim 1 or claim 2, characterized in that the fluoroelastomer is selected from the class consisting of
   vinylidene fluoride, hexafluoropropylene and tetrafluoroethylene terpolymers;
   vinylidene fluoride, tetrafluoroethylene and perfluoromethyl-vinyl-ether terpolymers;
   tetrafluoroethylene and propylene copolymers;
   vinylidene fluoride and chloro-trifluoroethylene copolymers;
   vinylidene fluoride hydropentafluoropropylene copolymers; and
   vinylidene fluoride, hydropentafluoropropylene and tetrafluorethylene terpolymers,
   and the corresponding products containing in the chain small quantities of bromine.

4. A granular composition according to claim 1, characterized in that the polyolefin is selected from the class consisting of low, medium and high-density polyethylene;
   prevailingly isotactic macromolecules with polypropylene;
   propylene-ethylene copolymers with a predominant content in propylene, both "random" and "block"; and mixtures thereof.

5. A granular composition according to claim 4, characterized in that the polyolefin is a low-density polyethylene.

6. A granular composition according to claim 4, characterized in that the polyolefin is polypropylene.

7. A granular composition according to claim 1 or claim 2, characterized in that besides the polyolefin, there is present a per se known anti-caking agent selected from barium sulphate, calcium stearate, and talc.

8. A process for preparing a free-flowing granular fluoroelastomer comprising admixing said fluoroelastomer with from 5 to 70% by weight of a polyolefin in the form of a powder, thereby providing a coating of polyolefin powder on the surface of the fluoroelastomer granules.

9. A process according to claim 8, wherein the fluoroelastomer is admixed with from 10 to 30% by weight of the polyolefin.

10. A process according to claim 8 or 9 characterized in that the fluoroelastomer has a fluorine content greater than 65% by weight.

11. A process according to claim 8 or 9, characterized in that the fluoroelastomer is selected from the class consisting of vinylidene fluoride, hexafluoropropylene and tetrafluoroethylene terpolymers; vinylidene fluoride, tetrafluoroethylene and perfluoromethyl-vinyl-ether terpolymers; tetrafluoroethylene and propylene copolymers; vinylidene fluoride and chloro-trifluoroethylene copolymers; vinylidene fluoride and hydropentafluoropropylene copolymers; and vinylidene fluoride, hydropentafluoropropylene and tetrafluoroethylene terpolymers, and the corresponding products containing in the chain small quantities of bromine.

12. A process according to claim 8 or 9, characterized in that the polyolefin is selected from the class consisting of low, medium and high-density polyethylene; polypropylene having prevailingly isotactic macromolecules; propylene-ethylene copolymers with a predominant content of propylene, either with a random or a block distribution; and mixtures thereof.

13. A process according to claim 12, characterized in that the polyolefin is a low-density polyethylene.

14. A process according to claim 12, characterized in that the polyolefin is polypropylene having prevailingly isotactic macromolecules.

* * * * *